(12) United States Patent
Atkinson

(10) Patent No.: US 7,693,412 B2
(45) Date of Patent: Apr. 6, 2010

(54) AUREOLEGRAPH

(75) Inventor: John James Atkinson, Lynnfield, MA (US)

(73) Assignee: Visidyne, Inc., Burlington, MA (US)

( * ) Notice: Subject to any disclaimer, the term of this patent is extended or adjusted under 35 U.S.C. 154(b) by 408 days.

(21) Appl. No.: 11/340,221

(22) Filed: Jan. 26, 2006

(65) Prior Publication Data
US 2006/0193628 A1 Aug. 31, 2006

Related U.S. Application Data

(60) Provisional application No. 60/650,429, filed on Feb. 4, 2005.

(51) Int. Cl.
*G03B 13/24* (2006.01)
(52) U.S. Cl. ........................ 396/150; 359/448
(58) Field of Classification Search ................ 33/1 SC; 359/448, 400; 396/432, 150; 313/524
See application file for complete search history.

(56) References Cited

U.S. PATENT DOCUMENTS 3,791,274 A * 2/1974 Hansen ........................ 396/351
7,447,537 B1 * 11/2008 Funda et al. ................. 600/424

OTHER PUBLICATIONS

Brueckner et al., The Large Angle Spectroscopic Coronagraph (LASCO), Dec. 1995, Solar Physics, vol. 162, Nos. 1-2, pp. 357-402.*

Carboni, Giorgio; "The Sky in a Room"; May 1996; Fun Science Gallery Internet Webpage; <http://www.funsci.com/fun3_en/sky/sky.htm>.*
Internet Archive Webpage; <http://web.archive.org/web/*/http://www.funsci.com/fun3_en/sky/sky.htm>.*
M Rainwater and L. Gregory, "*Cimel Sunphotometer (CSPHOT) Handbook*", ARM TR-056, Jan. 2005, pp. 1-12, (14 pages total).
B. Lyot, "*La Couronne Solair Etudiee en Dehors des Eclipses*", Comples Rendus de L'Acadimie des Sciences, Paris 191, 834-837 (1930).
C. L. Strong, "*A Coronagraph to View Solar Prominences*", Scientific American, The Amateur Astronomer, pp. 99-103 (1955).
Ritter, J. and Voss, K., "*A New Instrument for Measurement of the Solar Aureole Radiance Distribution from Unstable Platforms*", The Journal of Atmospheric and Oceanic Technology, vol. 17, pp. 1040-1047 (American Meteorological Society, 2000).
Lyot, B. "*The Study of the Solar Corona Without an Eclipse*", the Journal of the Royal Astronomical Society of Canada, Jul.-Aug. 1933, vol. XXVII, No. 6, pp. 225-234.
Lyot, B. "*The Study of the Solar Corona Without an Eclipse*", the Journal of the Royal Astronomical Society of Canada, Sep. 1933, vol. XXVII, No. 7, pp. 265-280.

* cited by examiner

*Primary Examiner*—Christopher E Mahoney
*Assistant Examiner*—Autumn Parker
(74) *Attorney, Agent, or Firm*—Iandiorio Teska & Coleman

(57) ABSTRACT

An aureolegraph includes a reflective screen with an aperture therein, a lens for focusing an image onto the screen, an imager for imaging the image on the screen, and a light trap for preventing light passing through the aperture in the screen from passing back out through the aperture.

10 Claims, 5 Drawing Sheets

AUREOLEGRAPH

RELATED APPLICATIONS

This application claims priority to the provisional Patent Application Ser. No. 60/650,429 filed Feb. 4, 2005 which is incorporated herein by this reference.

FIELD OF THE INVENTION

This subject invention relates to a device useful for studying the solar aureole.

BACKGROUND OF THE INVENTION

In general, the solar aureole is hardly evident on a clear day with no airborne particles but grows in size in hazy conditions and/or in the presence of airborne particles.

Observing and imaging the solar aureole is of interest in various fields: determining the quantity, size, shape, distribution and type of airborne particles; correcting for the effects of clouds between a satellite mounted imager and a light source below the cloud; and in climate studies.

The problem of observing the aureole is similar to that of observing the solar corona. The usual equipment for imaging the aureole or corona is a coronagraph which includes an opaque disk or "occulter" just large enough to blot out the solar disk. See B. Lyot, "*La Couronne Solair Etudiee en Dehors des Eclipses*", Comples Rendus de L'Acadimie des Sciences, Paris 191, 834 (1930). See also, C. L. Strong, "*A Coronagraph to View Solar Prominences*", Scientific American, The Amateur Astronomer, pp. 99-103 (1955). See also Ritter, J. and Voss, K., "*A New Instrument for Measurement of the Solar Aureole Radiance Distribution from Unstable Platforms*", The Journal of Atmospheric and Oceanic Technology, Vol. 17, pp. 1040-1047 (American Meteorological Society, 2000). These three references are incorporated herein by this reference.

Commercially available coronagraphs, however, are extremely expensive, limited in supply, and include numerous precision optical surfaces.

SUMMARY OF THE INVENTION

It is therefore an object of this invention to provide an aureolegraph designed to image the solar aureole.

It is a further object of this invention to provide such an aureolegraph which can be manufactured at a much lower cost than conventional coronagraphs.

It is a further object of this invention to provide such an aureolegraph which does not require numerous precision optical surfaces.

It is a further object of this invention to provide such an aureolegraph which is simple in design.

It is a further object of this invention to provide such an aureolegraph which can be used to observe any weak off-axis signal in the presence of a strong on-axis signal including, but not limited to, observations of the solar or lunar aureole, or the solar corona.

It is a further object of this invention to provide a method of making an aureolegraph and a method of imaging a weak off-axis signal in the presence of a strong on-axis signal.

The subject invention results from the realization that instead of using an opaque disk to block out the solar disk in order to image and view the solar aureole, the image of the sun and its aureole can be focused onto a reflective screen with an aperture therein sized at least as large as the image of the solar disk in combination with a light trap behind the aperture which prevents incident light passing through the aperture from reflecting back out through the aperture. Light from the solar disk passes through the aperture to minimize bright solar disk light which would otherwise scatter within the instrument and interfere with light from the aureole which is generally much dimmer. The pattern of intensity within the aureole is observed via an imager focused on the screen.

The subject invention, however, in other embodiments, need not achieve all these objectives and the claims hereof should not be limited to structures or methods capable of achieving these objectives.

This invention features an aureolegraph comprising a reflective screen with an aperture therein, a lens for focusing an image onto the screen, an imager for imaging the image on the screen, and a light trap for preventing light passing through the aperture in the screen from passing back out through the aperture.

Typically, the reflective screen, the lens, and the light trap are disposed within a housing, the light trap being a non-reflective cavity in the housing behind the screen. The housing may include a mirror between the screen and the lens and then the imager includes a lens aimed at the mirror. In one example, the housing includes a portion in front of the lens sized to reject illumination outside of a predetermined field of view. The lens may be fitted in a wall in the housing spaced from the screen. Typically, distance between the lens and the screen is the same as or approximately the same as the focal length of the lens and the size of the screen and the focal length of the lens are selected to define a predetermined field of view. In one example, the lens had a focal length of 300 mm and the screen had a diameter of 115 mm. Typically, the size of the screen aperture is selected to be at least as large as the image of the solar disk in the focal plane of the screen and the lens is positioned relative to the screen and has a focal length selected to focus an image of the solar aureole on the screen. One example of an imager is a CCD camera with a lens selected to give the imager a field of view which matches the size of the screen.

This invention also features a method of imaging a weaker off-axis signal in the presence of a stronger on-axis signal. The weaker off-axis signal is focused on a screen with an aperture therein for passing through the stronger on-axis signal. The stronger on-axis signal is trapped and the screen is imaged.

This invention also features a method of making an aureolegraph. A reflective screen with an aperture therein is assembled in a housing. A lens is placed in front of the reflective screen to focus an image onto the screen. A light trap behind the screen prevents light passing through the aperture from passing back out the aperture. An imager lens is oriented to view the screen.

One example of an aureolegraph in accordance with this invention features a housing, a reflective screen with an aperture therein in the housing, a lens in the housing in front of screen for focusing an image onto the screen, an imager attached to the housing for imaging the image on the screen, and a light trap behind the screen in the housing for preventing light passing through the aperture in the screen from passing back out of the aperture.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
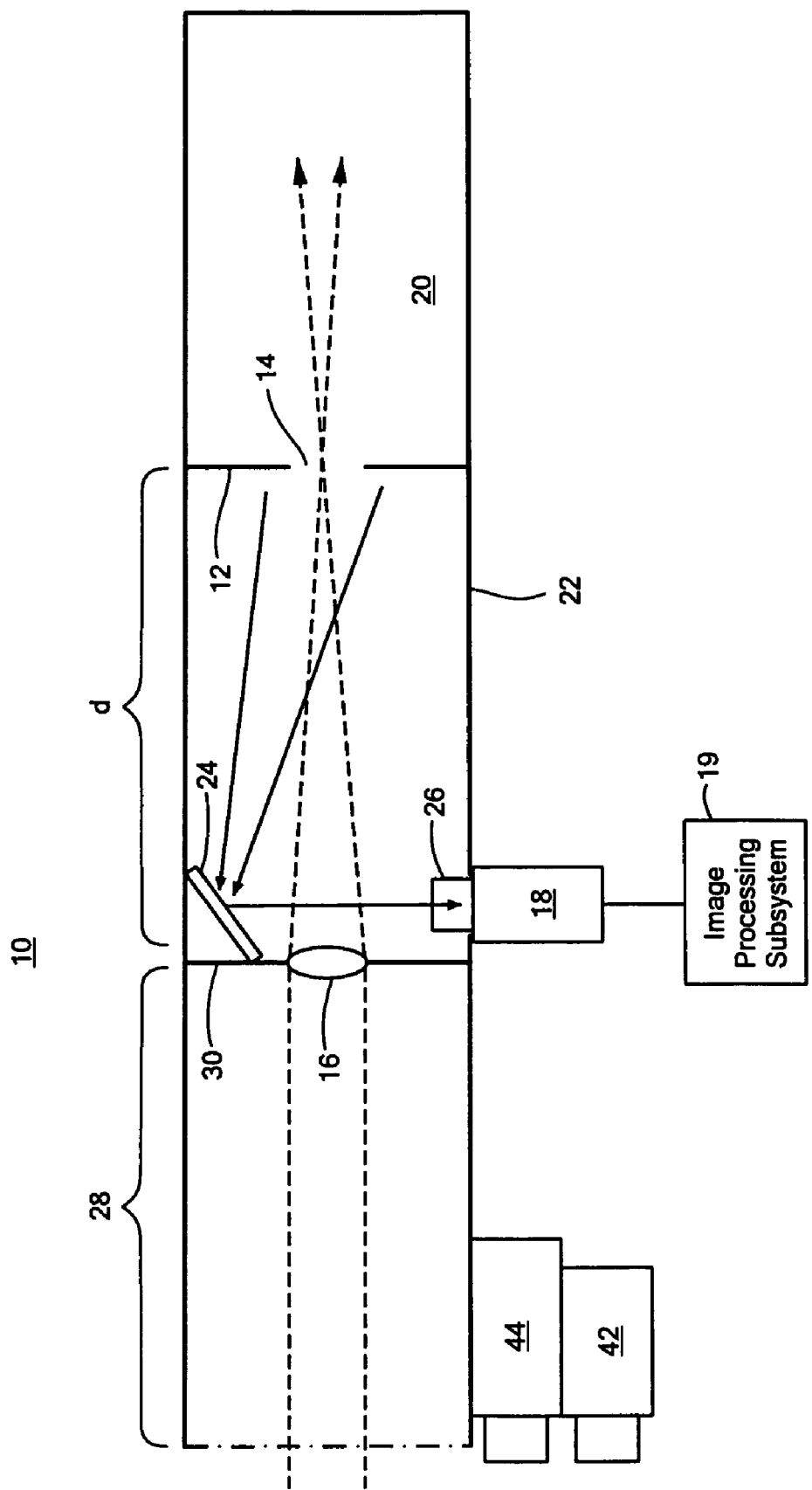
FIG. 1 is a schematic side cross-sectional view of one preferred embodiment of an aureolegraph in accordance with the subject invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 2:
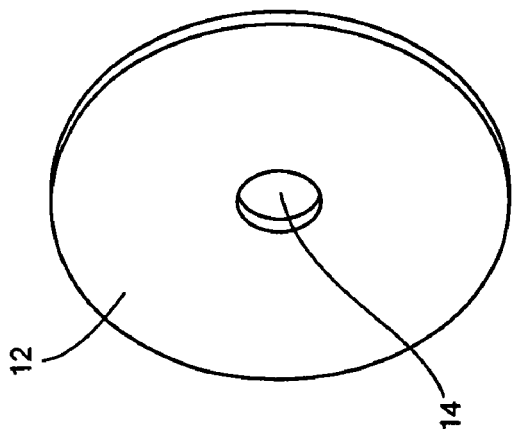
FIG. 2 is a schematic three-dimensional view of the reflective screen component of the aureolegraph shown in FIG. 1.

In one preferred embodiment, aureolegraph 10, FIG. 1 includes reflective screen 12 with solar beam dump aperture 14 therein (see also FIG. 2), lens 16 for focusing an image onto screen 12, imager 18 for imaging the image on the screen, and light trap 20 for preventing light which passes through aperture 14 from passing back out through the aperture in screen 12. Imager 18 may provide an output to image processing subsystem 19.

Figure 3:
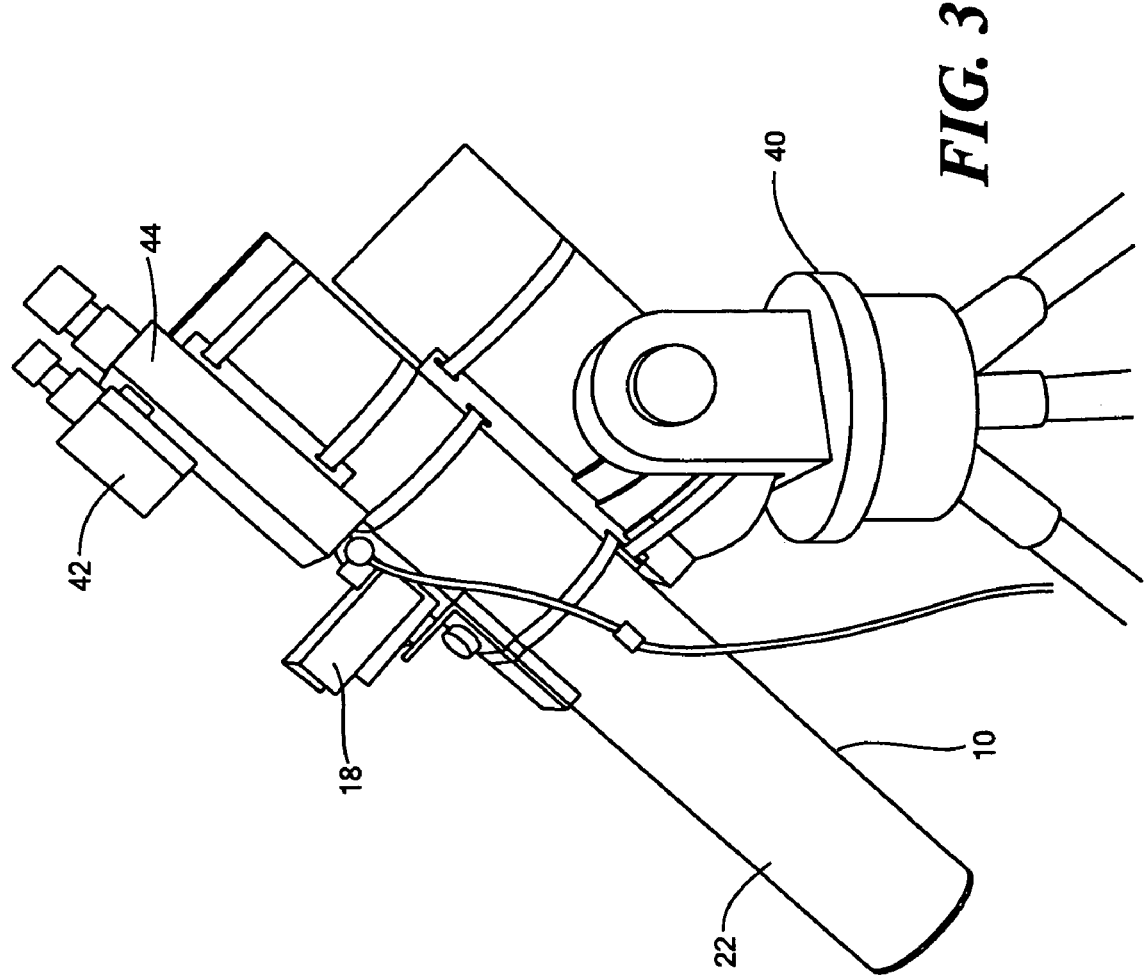
FIG. 3 is a schematic three-dimensional view showing the aureolegraph of FIG. 1 mounted on an altitude/azimuth mount.

Typically, reflective screen 12, lens 16, and light trap 20 are positioned within instrument housing 22 also shown in FIG. 3. Light trap 20, in this example, is a non-reflective blackened 250 mm long cavity in housing 22 behind screen 12. Angled mirror 24 between screen 12 and lens 16 redirects light rays striking screen 12 to imager 18. Imager 18 may be a CCD camera attached to housing 22 and including lens 26 aimed at mirror 24. The camera may, in addition, be equipped with one or more filters (not shown). Lens 26 preferably is selected to give imager 18 a field of view which matches the size of screen 12.

Optionally, housing 22 may be extended in front of lens 16 to form a baffle 28 with dimensions (e.g., 240 mm long by 115 mm in diameter) selected to reject illumination outside of a predetermined field of view (e.g., ±10° or 20°). Lens 16 may be a simple pin-hole in wall 30 or, instead, an optical lens is fitted in wall 30 in housing 22 and has a focal length (e.g., 300 mm) the same as or approximately the same as the distance d between wall 30 and screen 12. The image of solar aureole is thus focused on screen 12. Screen 12 has a diameter (e.g., 115 mm) selected, based on the focal length of lens 16, to define a predetermined field of view. The size of screen aperture 14 (e.g., 5.1 mm) is selected to be at least as large as the image of the solar disk in the focal plane of screen 12.

Lens 16 focuses an image of the sun on screen 12 and the light from the sun's solar disk passes through aperture 14 and into darkened cavity 20 to minimize bright solar disk light which would otherwise scatter within housing 22 and interfere with light from the aureole (which is generally much dimmer) focused on screen 12 and imaged by CCD camera 18 having lens 26 focused on screen 12 via angled mirror 24.

As shown in FIGS. 1 and 3, aureolegraph 10 may be mounted on altitude-azimuth tracking mount 40 and a second CCD camera 42 and infrared (e.g., 1.6 µm) radiometer 44 are also mounted on aureolegraph 10. The second CCD camera 42 and infrared radiometer 44, which may be equipped with appropriate optical filters (not shown), provide information from the solar disk that is complementary to that gathered from imager 18 and in order to determine the quantity, size, shape, distribution and type of airborne particles.

Figure 4:
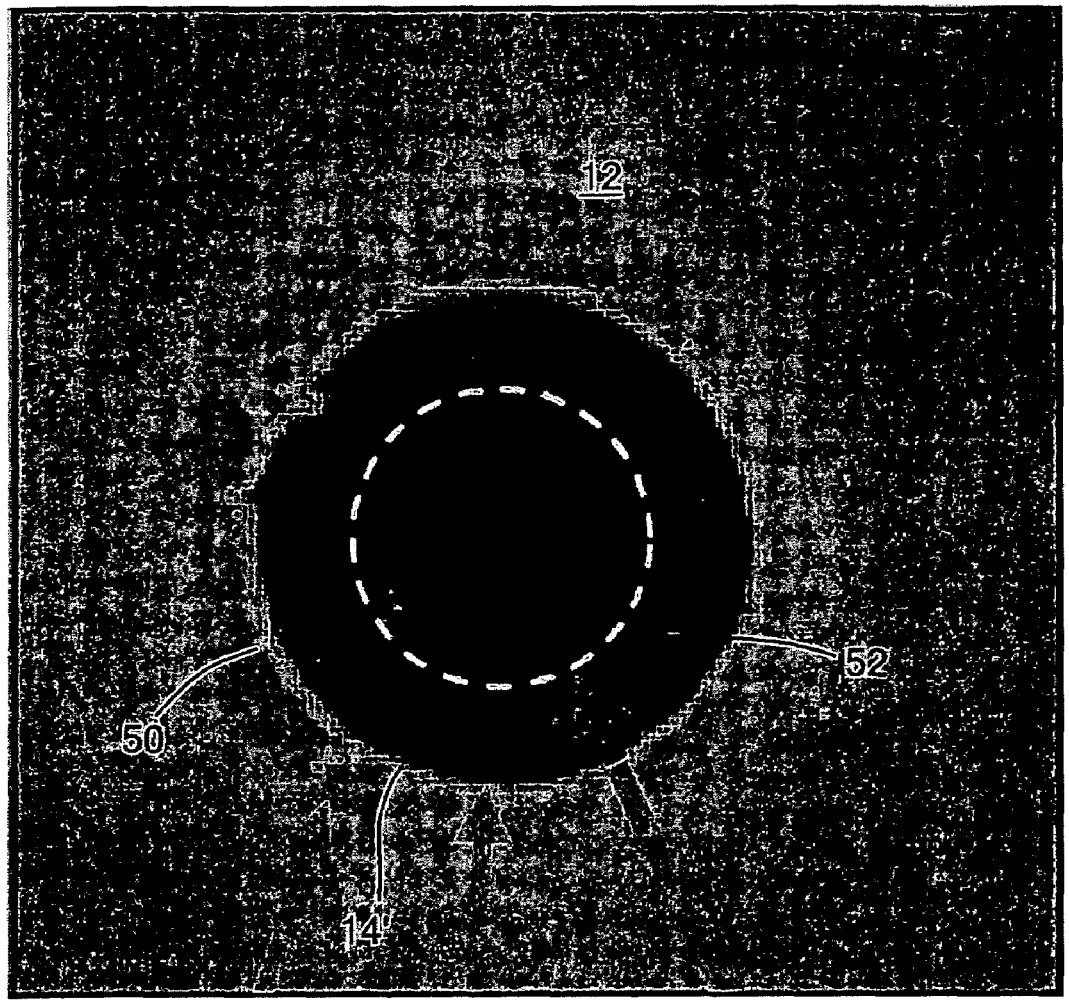
FIG. 4 is a depiction of the reflective screen of the aureolegraph with an image of the solar aureole focused thereon.
Figure 5:
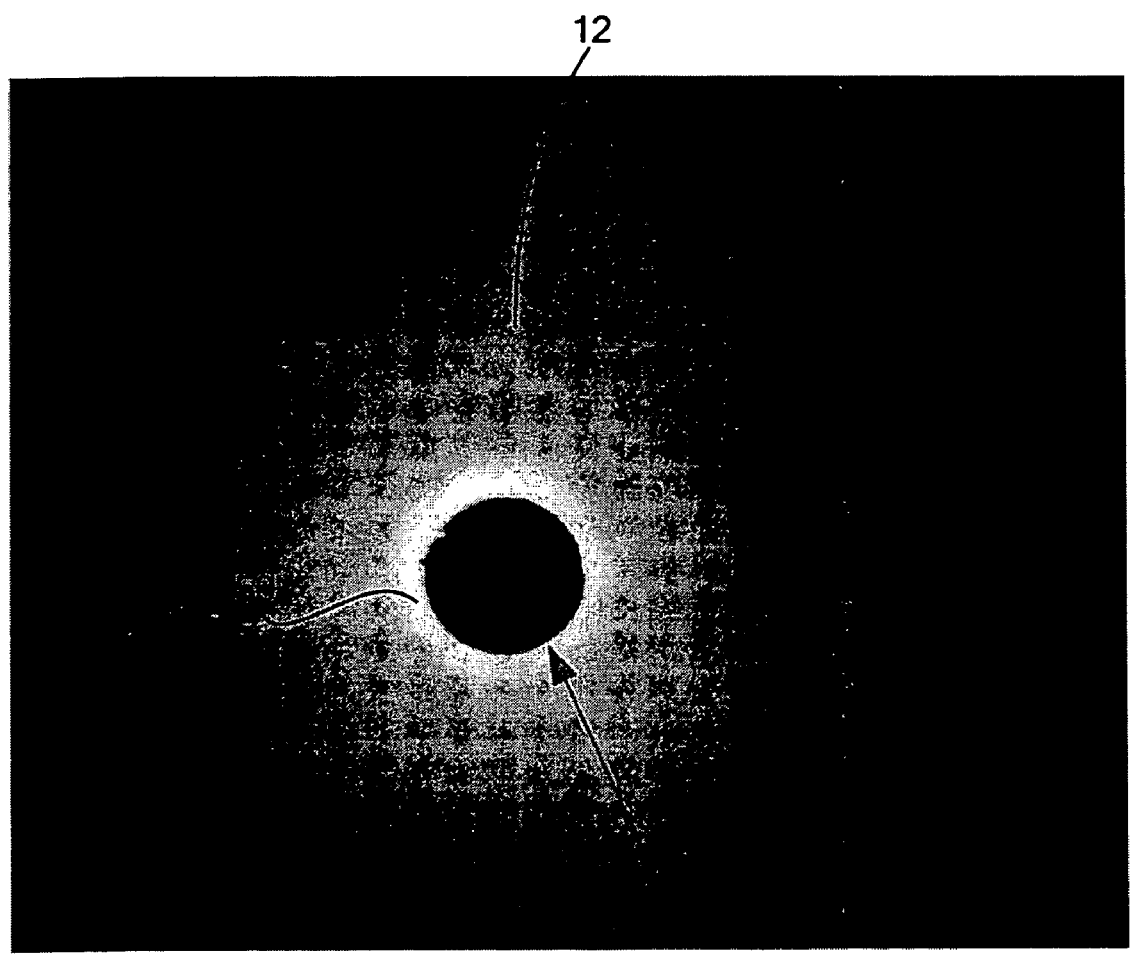
FIG. 5 is another depiction of the reflective screen of the aureolegraph of the subject invention with an aureole image focused thereon.

FIG. 4 shows an image on screen 12 with the aureole depicted at 50 about aperture 14 (1° diameter) and an outline of the solar disk (½° diameter) shown in phantom at 52. FIG. 5 also shows an image on screen 12 with the aureole visible at 50'. Larger particle (60 µm) scatter closer to the solar disk as shown.

The aureolegraph of the subject invention is thus useful in detecting the quantity, size, shape, type, and distribution of air-borne particles and also in climate studies. The solar corona and the lunar aureole can also be imaged using the subject aureolegraph. Other uses would include the observation of any weak-off-axis signal in the presence of a strong-on-axis signal.

Figure 6:
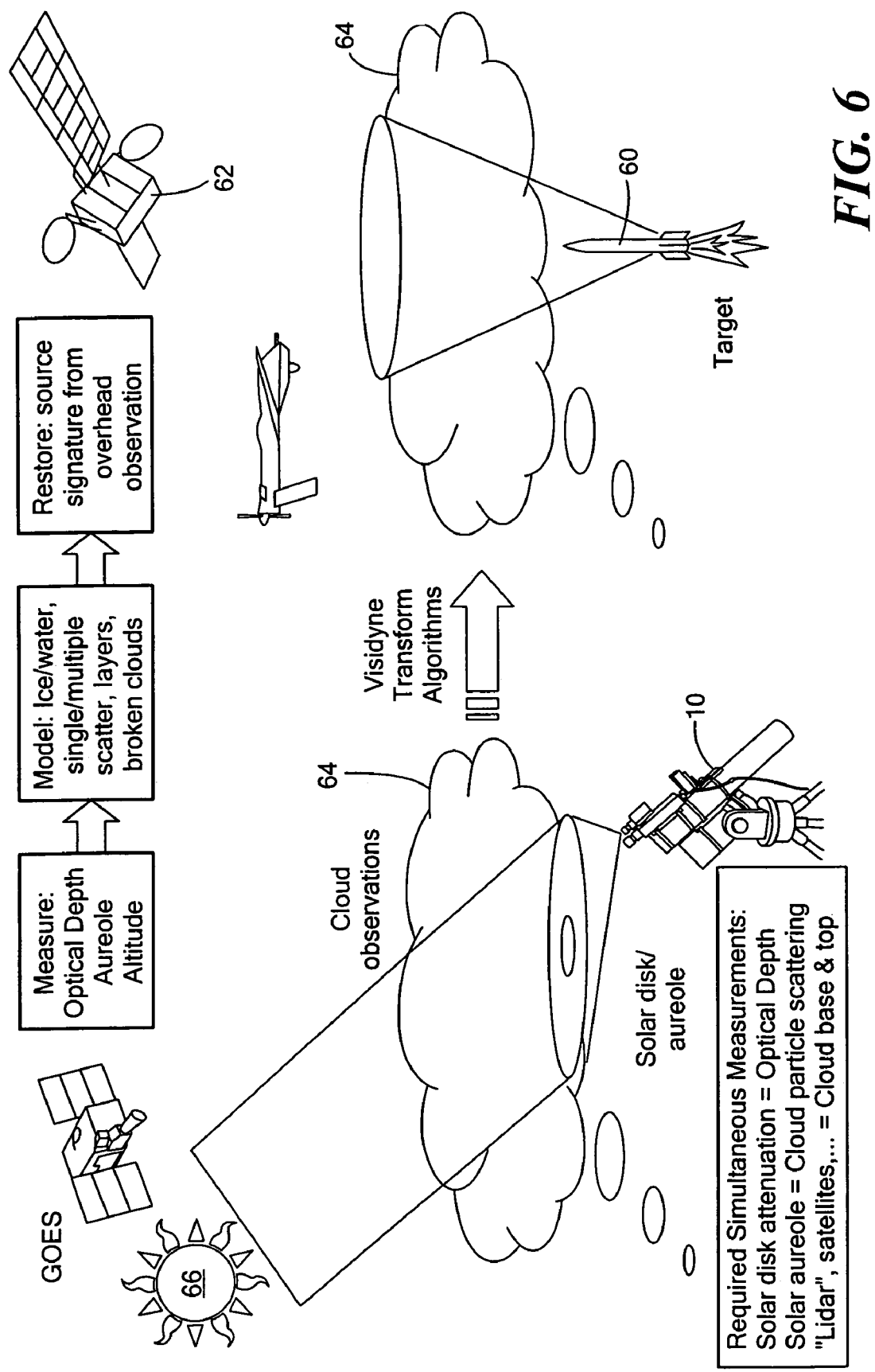
FIG. 6 is a highly schematic view showing a use of the aureolegraph of the subject invention to make measurements of cloud data.

One additional use of aureolegraph 10, FIG. 1 is depicted in FIG. 6 where target 60 is to be detected by satellite 62 but cloud 64 between the optical subsystem on board satellite 62 and target 60 interferes with the ability of satellite 62 to differentiate target 60 from other light sources. Aureolegraph 10 images sun 66 through cloud 64 and outputs signals useful for measuring optical depth, the aureole, and to model cloud 60. These observations are then used to correct or restore the satellite's observation of target 60 due to cloud 64.

The advantages of the subject invention include the ability to engineer and manufacture aureolegraph 10, FIGS. 1 and 3 at a much lower cost than a conventional coronagraph. Numerous precise optical surfaces are not required. Furthermore, since the bright on-axis light is always trapped, the imager is not subjected to possible damage.

One method of imaging a weaker off-axis signal in the presence of a stronger on-axis signal in accordance with this invention includes focusing the weaker off-axis signal on screen 12, FIG. 1 with aperture 14 therein for passing through the stronger on-axis signal. The stronger on-axis signal is trapped in light trap 20. The screen is imaged by the combination of CCD camera 18 with lens 26 aimed at mirror 24. Aureolegraph 10 is made by assembling reflective screen 12 with aperture 14 therein in housing 22. Lens 16 is placed in front of reflective screen 12 to focus an image onto the screen. Light trap 20 is placed behind screen 12 to trap light passing through the aperture 14. Imager lens 26 is oriented to view screen 12.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. An aureolegraph comprising:
    a housing with an opening configured to view the sun, its solar disk, and its aureole;
    a lens spaced from the opening, through which light passes, and having a focal length which focuses an image of the solar disk and its aureole on a reflective screen;
    the reflective screen disposed in the housing behind the lens and having an aperture therein sized to be at least as large as the image of the solar disk so that an image of the solar aureole can be more prominently displayed on the reflective screen;
    a light trap behind the screen configured to prevent light passing through the aperture in the reflective screen from passing back out through the aperture; and
    a camera positioned with respect to the housing to capture the image of the solar aureole displayed on the reflective screen.

2. The aureolegraph of claim 1 in which the light trap is a non-reflective cavity in the housing behind the screen.

3. The aureolegraph of claim 1 in which the housing includes a mirror between the screen and the lens.

4. The aureolegraph of claim 3 in which the camera includes a lens aimed at the mirror.

5. The aureolegraph of claim 1 in which the lens is fitted in a wall in the housing spaced from the screen.

6. The aureolegraph of claim 1 in which the distance between the lens and the screen is the same as or approximately the same as the focal length of the lens.

7. The aureolegraph of claim 1 in which the size of the screen and the focal length of the lens are selected to define a predetermined field of view.

8. The aureolegraph of claim 7 in which the lens has a focal length of 300 mm and the screen has a diameter of 115 mm.

9. The aureolegraph of claim 1 in which the size of the screen aperture is selected to be at least as large as an image of a solar disk in the focal plane of the screen.

10. The aureolegraph of claim 1 in which the camera is a CCD camera with a lens selected to provide a field of view which matches the size of the screen.

\* \* \* \* \*